Patented Aug. 13, 1929.

1,724,501

UNITED STATES PATENT OFFICE.

GILBERT MOMBACH, OF CINCINNATI, OHIO.

PROCESS OF MOLDING RESINOUS CONDENSATION PRODUCTS.

No Drawing.    Application filed April 14, 1926.  Serial No. 102,073.

My invention relates to process of molding condensation products such as polymerized oxybenzyl-methylenglycolanhydrides and their homologues.

There are a number of resinous condensation products which are particularly useful for certain types of articles due to the fact that these products are insoluble in all known solvents and inert in most chemical reagents, particularly acid reagents. These products have the quality of great resistance to aging and a very low co-efficient of expansion. They may be made from phenols or cresols with formaldehyde or urotropine. Various aldehydes and ketones may also be used. There are many modifications in these condensation products, and inasmuch as my process refers to a process of molding such products and not to any particular chemical combinations, in the specification and claims which follow, I shall refer to this class of products as resinous condensation products. As a specific example of the type of condensation products of which my molding process contemplates the use, reference is made to the Baekeland Patent #949,671 of February 15, 1910, which contemplates the use of phenol formaldehyde condensation products.

In the above noted patent it is said: "In case it is desired to indurate loose fibrous materials, as for instance wood-pulp, cotton asbestos or the like, it may be necessary or desirable to subject the impregnated mass to pressure while the reaction is proceeding, in order to better insure its hardening or to determine a desired shape of the completed body. Special molds can be used for this purpose to obtain specified shapes, and the operation may be similar in some respects to the vulcanization of rubber products". The special molds which have been used to carry out such molding of condensation products have been made from heavy metal and have necessitated considerable expense in manufacture so that for all practical purposes the use of such condensation products for articles of manufacture which require the production of only one or a few units has been prohibitive because of the cost of manufacturing the metal molds.

It is the object of my invention to provide a simple and inexpensive process for molding small articles which do not require quantity production. In my process I contemplate the use of molds made from hardened plaster of Paris, artificial stone, powdered marble or other similar materials from which a mold may be made while the material is in plastic condition. I further have as an object and an important feature of my process, the use of plastic materials which themselves are insoluble, in certain reagents in which the molding material is also insoluble, with which, materials which are soluble in these certain reagents are intimately mixed. As a specific example of the necessity of the use of such a composition during the molding, if plaster of Paris dies are used for molding such condensation products, it will be found that small particles of the plaster will adhere within crevices of the molded article. The molded article itself and the plaster of Paris are insoluble in acid solutions but by mixing with the plaster of Paris, a certain percentage of powdered zinc dust, for example, the acid will corrode the plaster of Paris by the formation of small bubbles where it has attacked the zinc powder, and the crevices in the molded articles can then be easily cleaned out. I have also learned that a powdered metal is preferable because of its heat conductivity.

As a further object of my invention, I contemplate the use of acid soluble materials for forming a separating layer between complementary parts of the mold. Inasmuch as an article made from a condensation product will be insoluble in acid, the cleaning of the separating material from the molded article may be easily accomplished by an acid wash.

As a specific example of a particular use for which my process is adapted, I contemplate the manufacture of artificial dentures and dental appliances to be worn in the mouth. Due to the irregularity of different persons' mouths the value of a process which will enable the comparatively inexpensive manufacture of condensation products into supporting plates for dentures is of considerable importance. In dentures made from hard rubber or vulcanized products, in order to secure a color which will be similar to that of the gums, materials are usually mixed with the rubber which weakens it structurally. Most dentures therefor, have the parts which are subject to the greatest strain of black or deep red color such as the portions which adhere to the roof of the mouth, and for this reason they are unsightly. Dentures made from vulcanized products cannot be subjected to boiling temperatures, as such treatments will warp and disintegrate the vulcanized plates.

Thus, while my process contemplates the use of known materials in what might broadly be considered a known way, the modifications which I suggest, which spell the difference between practical application and failure mark an advance in the art of no small importance.

Referring specifically to my proposed method of manufacturing artificial dental appliances, I first proceed in the usual manner to take an impression of the gums with plaster of Paris, or other suitable impression material. A separating layer such as a coating of silicate of soda, paint, varnish or other suitable solution is then distributed over the impression. A positive of the impression is then made by pouring over the impression a suitable plastic compound which will harden upon cooling or upon standing. The positive is then allowed to harden. The bite is then taken and the positive is mounted on the articulator. Artificial teeth are then selected and set up in wax to the proper occulsion. The wax model with the teeth in proper position is then invested in the lower half of a flask with the teeth extending with their cusps or occlusal surfaces upward. Plastic material which will harden after an interval, is then poured into the flask and filled around the wax denture to the edges thereof. The flask is then set aside to allow the investment material to harden. The exposed portions of the hardened investment material are then coated with a separating medium such as silicate of soda. It will be preferable at this stage to take care that no silicate is coated on the teeth. The upper portion of the flask is then filled with plastic material to form the counter die. This plastic material or at least that part which encloses the cusps of the teeth, which may be plaster of Paris, will have mixed with it a material which is soluble in a liquid in which the plaster of Paris is insoluble. The particular object of having that portion of the plastic material in the counter die which surrounds the teeth, mixed with such a material which may for example be zinc dust, powdered magnesium metal, iron powder, or calcium carbonate is that after the plastic material has set, if it be plaster of Paris, it may be so disintegrated by an acid bath, that it will readily disintegrate from the crevices between the teeth.

As condensation products and those which have similar physical properties require both heat and pressure during molding it is preferable that a metal powder be used in combination with the plaster of Paris. Metal powder being a good conductor of heat transmits the heat to the material to be molded much more readily than does the plaster of Paris by itself. Consequently, by using metal powder a double purpose is achieved, as the metal will disintegrate with acid with the evolution of a gas, and the mold will transmit the heat much more readily.

The die and the counter die, which usually consist of the lower part of the flask and the upper part, are then separated and the counter die with the teeth imbedded in it with pins with which the teeth are secured in the plate still retained in the wax, is then treated to remove the wax. This is usually accomplished by scraping out most of the wax and then melting out the remaining part with hot water. The die or counter die is then cut with grooves to allow any excess of the molding material to escape. The die and counter die are now ready for the next step which is the molding of the condensation material to form the plate. After the plastic dies have hardened, they may be heated to the temperature of the platen of the press and mounted in a press, preferably a hydraulic press which may be of any preferred type and which will also preferably be provided with heating means. Before inserting the condensation product, the surfaces of the dies which are to be exposed to the condensation material are treated so that they will readily separate. I have several preferred ways of treating these surfaces. I may insert layers of tin foil and burnish them to the surfaces. I may paint the surfaces with a metallic powder dissolved in amylacetate (banana oil) or other suitable medium. There are a wide range of materials which may be used to accomplish the separating effect, the broad principle being to provide a metal or a metallic salt either dissolved in a solvent or in such a thin layer, that it may be readily removed from the molded article to which portions of the separating agent will usually adhere by an acid bath. Thus in this step I provide a separating layer between the molds which is soluble in acid. The condensation material to be molded to form the plate is then packed in the impression cavity, and the compressing and molding is then completed.

After the compressing operation in which the pressure may be run as high as 8000 lbs. per square inch the dies are separated and the molded articles removed. The use of hardened plastic material for dies for molding condensation products is to the best of my knowledge and belief broadly new, as it has hitherto not been considered possible to utilize as great pressure as is needed to properly mold resinous condensation products in hardened plastic dies.

In molding such articles as artificial dentures the upper of what I have called the counter die is ruined after one molding operation, as portions of it will adhere to the teeth and have to be cleaned off by chipping or by an acid bath or by a combination of both processes. In molding articles which do not require insertion of unmolded articles such as the teeth within the molding compound the dies may be used more than once, although for most accurate work, it will be preferable to use the dies only once. Although I prefer to utilize condensation products unmixed, various fillers may be compounded with the condensation products if desired.

Having thus described my invention what I claim as new and desire to secure by Letters Patent is:

1. A process of molding material having physical properties similar to resinous condensation products into articles, which consists in making of a plastic material containing a heat conductive metal powder impressions consisting of a die and a counter die about a model of the article to be molded, and inserting the material within the dies thus made, and heating the die and counter-die and subjecting the material to pressure of several tons per square inch between said die and counter die.

2. A process of molding material comprising resinous condensation products into articles providing a mounting for unmolded elements therein which consists in making plastic dies consisting of impressions of the article to be molded, with the plastic substance in one of the dies supporting the unmolded elements, mixing material chemically combinable with the evolution of a gas in a liquid in which the plastic material is insoluble in said plastic filled die, compressing the condensation material between said dies, and chemically breaking down with the evolution of a gas that portion of the plastic material which adheres to crevices between the unmolded elements.

3. That process of molding artificial dentures comprising plates supporting teeth which consists in making dies of plastic material with one of the dies temporarily holding the teeth to be supported by the plate, employing in that portion of the plastic material which is to temporarily hold the teeth a percentage of material which will disintegrate the plastic die by chemical action with the evolution of a gas, forming the plastic dies, and compressing heated material comprising resinous condensation products between said dies with the teeth imbedded in said material.

4. That process of molding artificial dentures comprising plates supporting teeth which consists in making dies of plastic material with one of the dies temporarily holding the teeth to be supported by the plate, employing in that portion of the plastic material which is to temporarily hold the teeth a percentage of material which will disintegrate the plastic die material by chemical action with the evolution of a gas, forming the plastic dies, and compressing heated material comprising resinous condensation products between said dies with the teeth imbedded in said material and coating the compression faces of the dies with acid soluble material.

5. That process of molding articles with hardened plastic dies which consists in mixing with the plastic material a material chemically active with the evolution of a gas in a liquid in which said plastic material is insoluble, whereby plastic material adhering to said article to be molded may be removed by chemical action with the evolution of a gas.

6. That process of molding artificial dentures comprising plates supporting teeth which consists in making dies of plastic material with one of the dies temporarily holding the teeth to be supported by the plate, employing in intimate admixture with the plastic material a percentage of metal powder which will disintegrate the plastic die by chemical action with the evolution of a gas, forming the plastic dies, and compressing and heating material comprising resinous condensation products between said dies, in which the metal powder assists in the transmission of heat, with the teeth imbedded in said material.

7. The process of molding an artificial denture which consists in making plastic dies containing a percentage of metal powder, supporting the teeth to be retained in the denture in the plastic material, and compressing and heating resinous condensation material between the dies to form a plate in which the teeth will be retained.

GILBERT MOMBACH.